United States Patent [19]

Ford

[11] Patent Number: 5,417,239
[45] Date of Patent: May 23, 1995

[54] FUEL TRANSFER CONTROL APPARATUS

[76] Inventor: James D. Ford, 11 Lobo, Angleton, Tex. 77515

[21] Appl. No.: 252,879

[22] Filed: Jun. 2, 1994

[51] Int. Cl.⁶ .................................... F04B 49/025
[52] U.S. Cl. ................................. 137/571; 417/40
[58] Field of Search ............... 137/571, 575; 417/40

[56] References Cited

U.S. PATENT DOCUMENTS

| | | |
|---|---|---|
| 1,582,212 | 4/1926 | Folberth et al. |
| 1,629,545 | 5/1927 | Sherman et al. |
| 1,724,582 | 8/1929 | Hart |
| 3,101,771 | 8/1963 | McCuen .................. 137/571 X |
| 3,789,865 | 2/1974 | Borman |
| 4,166,713 | 9/1979 | Debrey ........................ 417/40 |
| 4,672,937 | 6/1987 | Fales et al. |
| 5,360,034 | 11/1994 | Manuelian ................ 137/571 |

*Primary Examiner*—Robert G. Nilson
*Attorney, Agent, or Firm*—Robert C. Curfiss; Nancy A. Talavera; Butler & Binion

[57] ABSTRACT

A fuel transfer control apparatus in a motor vehicle for automatically shutting off the transfer of fuel from an auxiliary tank to a main tank once the main tank is full and has begun to overflow. The transfer control apparatus is readily installed and includes a chamber having an inlet opening for receiving fuel overflow from the main tank and an outlet opening for connecting the main tank to an outside source of fuel. The transfer control apparatus also includes a sensor for monitoring the level of fuel in the chamber and a switch activated by the sensor for automatically stopping the transfer of fuel.

8 Claims, 1 Drawing Sheet

U.S. Patent      May 23, 1995      5,417,239
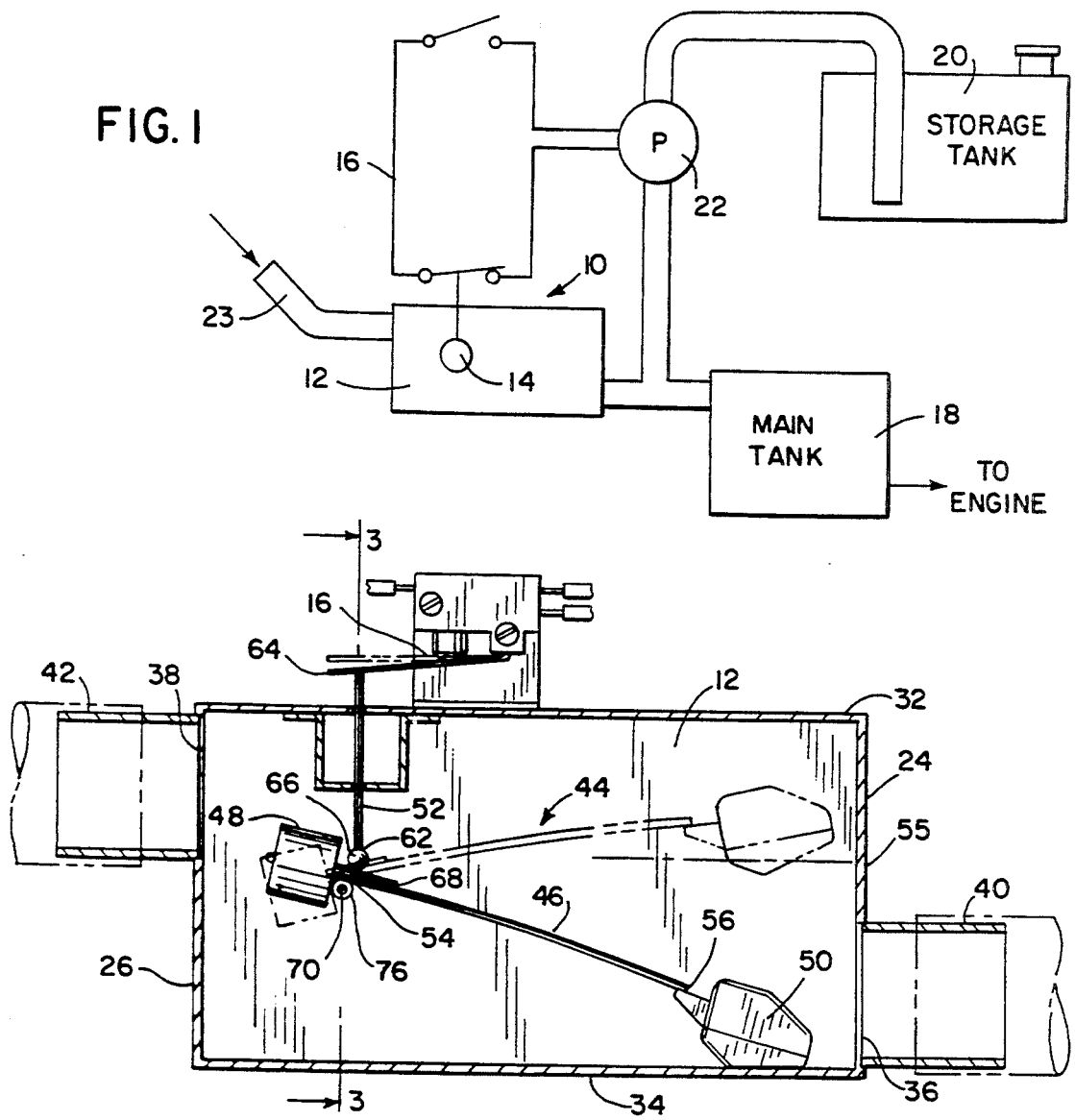
FIG. 1
FIG. 2
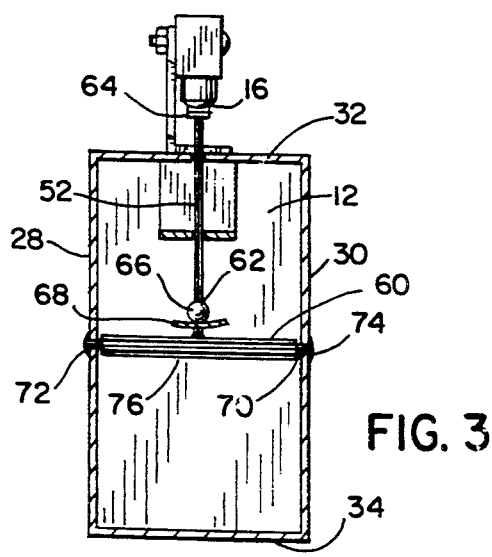
FIG. 3

FUEL TRANSFER CONTROL APPARATUS

BACKGROUND OF INVENTION

1. Field of Invention

The subject invention is generally related to monitoring devices for use in a motor vehicle and is specifically directed to a transfer control apparatus which automatically stops the transfer of fuel from an auxiliary fuel tank to a main fuel tank when the main tank is full.

2. Description of the Prior Art

The trucking industry is an integral part of everyone's life. In 1992, the trucking industry carried approximately 74% of all manufactured goods and accounted for 78% of the freight bill of the United States. Trucks are on the road 24 hours a day, every day of every year, carrying the freight that the nation's consumers and businesses need.

In the field of transport and distribution, good service and timely delivery are vital. As competition increases, the trucking industry continues to search for ways to increase productivity and efficiency. Over the years, truck manufacturers have improved road transport vehicles by making advances in important areas, such as weight reduction and aerodynamics, and by working to provide increased engine power while at the same time reducing the amount of fuel consumed.

While the amounts of fuel consumed have been reduced, large trucks still require considerably more gallons of fuel per mile than an average truck or car. Generally, a large truck will travel only 9 miles per gallon of fuel. In order to avoid frequent stops for refueling, transport trucks are usually equipped with a main fuel tank and a larger storage tank which is connected to the main tank. Typically, a main fuel tank can hold approximately 20 gallons of fuel and a storage fuel tank can hold 60 to 80 gallons. Because the storage tank is large, it is time consuming to fill the tank and is usually only filled once at the beginning of the trip.

In most cases, fuel from the storage tank can be transferred to the main tank while the vehicle is moving by turning a switch in the vehicle which activates a fuel pump. Thus, when the fuel monitor indicates that the gas in the main tank is low, the driver may choose to make a short stop to, refill the main tank or may opt to use the fuel in the storage tank. By activating the fuel pump, the driver can initiate a transfer of fuel from the storage tank to the main tank while in transit and can travel long distances without stopping to refuel. The ability to travel long distances without stopping to refuel may be crucial to making a timely delivery or if there is no place to obtain fuel en route.

While the ability to travel long distances without stopping is crucial, a major: disadvantage with the current practice of transferring fuel while in transit is that the driver is unable to easily determine when the main tank is full. Thus, the driver is unable to determine when the fuel pump should be turned off to stop the: transfer of fuel. If an attempt to monitor the fuel transfer is made, the driver's attention may be diverted from the road and may result in unsafe driving.

Rather than attempting to calculate when a sufficient amount of fuel has been transferred, it is common practice to leave the fuel pump on once it has been activated. However, this is a problem since the volume of fuel in the storage tank greatly exceeds the volume of the main tank. If the driver continues to transfer fuel once the main tank is full, the excess fuel from the storage tank may overflow and may be discharged onto the road or passing vehicles through the gas nozzle receptacle. In addition to wasting fuel and money, the discharge of excess fuel pollutes the environment. Further, loss of fuel which must then be replaced may reduce the efficiency and timeliness of the transport.

Therefore, there is a need for a fuel transfer control apparatus which automatically shuts off the transfer of fuel from the storage tank to the main tank when the main tank is full to prevent undesirable discharge of fuel onto the road or passing vehicle.

SUMMARY OF THE INVENTION

The subject invention is directed to a fuel transfer control apparatus for automatically shutting off the transfer of fuel from an auxiliary tank to a main tank when the main tank is full. The fuel transfer control apparatus of the subject invention may be installed in any motor vehicle which includes an auxiliary tank, a main tank and an activating means, such as a fuel pump, for transferring the fuel from the auxiliary tank to the main tank. The apparatus is specifically designed to monitor the fuel overflow from the main tank and automatically switch off the activating means to stop the transfer of fuel from the auxiliary tank once the main tank is full and has begun to overflow.

In the preferred embodiment, the transfer control apparatus is a hollow box having an inlet opening in the lower corner of one side of the box for receiving fuel overflow from the main tank. The box is positioned between the main fuel tank and the gas nozzle receptacle so that the excess fuel from the main tank overflows into the box instead of being directly discharged outside the vehicle through the gas nozzle receptacle. The box includes an outlet opening for connecting the box to the gas nozzle receptacle and providing access for fuel from an outside source to the main tank. The apparatus includes a short pipe extending from the inlet opening to connect the box to the main tank and a second short pipe extending from the outlet opening to connect the box to the gas nozzle receptacle.

The preferred embodiment of the subject invention includes a sensor, such as a float device, and a mechanism responsive to, the float device for turning off the fuel pump to stop the transfer of fuel. When the main tank is full, the excess fuel being transferred from the auxiliary tank flows into the box and raises the float. The mechanism may be a device, such as an electronic switch, which communicates with the activating means for transferring the fuel. Further, the float device includes a member which is responsive to the movement of the float for engaging and activating the switch.

Once the float has been raised to a predetermined level, below the level of the outlet opening, the member activates the switch and the fuel pump is automatically turned off to stop the transfer of fuel and prevent undesirable spillage. The switch of the preferred embodiment may also be connected to a pilot light in the vehicle to show when the main tank is full so that the driver may manually turn off the fuel pump.

Therefore, it is an object and feature of the subject invention to provide a fuel transfer control apparatus for use in a motor vehicle for automatically shutting off the transfer of fuel from an auxiliary tank to a main tank when the main tank is full.

It is also an object and feature of the subject invention to provide a fuel transfer control apparatus which is readily installed in any motor vehicle and designed to automatically switch off the activating means to stop the transfer of fuel from the auxiliary tank once the main tank is full and has begun to overflow.

It is a further object and feature of the subject invention to provide a fuel transfer control apparatus which is a hollow box having an inlet and outlet opening and a float device which is movable in response to fuel entering the box through the inlet opening.

It is yet another object and feature of the subject invention to provide a fuel transfer control apparatus with a switch which is activated when the float device is raised to a predetermined level to turn off the fuel pump and automatically stop the transfer of fuel from the auxiliary tank to the main tank.

Other objects and features will be readily apparent from the accompanying drawings and description.

BRIEF DESCRIPTION OF THE DRAWINGS

FIG. 1 is a diagram illustrating the fuel transfer apparatus in connection with the main tank and the auxiliary tank.

FIG. 2 is a cross sectional side view of the fuel transfer apparatus illustrating the inlet and outlet openings, the movement of the float device and the switch connected to and responsive to the movement of the float device.

FIG. 3 is a cross sectional view taken along line 3—3 of FIG. 2 illustrating the support mechanism for pivotally securing the float device in the chamber and the switch arm extending upward from the lever for activating the switch.

DETAILED DESCRIPTION OF THE DRAWINGS

Referring to FIGS. 1–3, the transfer control apparatus of the subject invention is designated generally by the reference numeral 10 and comprises a chamber 12, a sensor 14 and a switch 16 which is operable between "on" and "off" positions. As illustrated in FIG. 1, the apparatus 10 is designed for use in combination with a main tank 18, a storage or auxiliary tank 20 and an activating means, such as a fuel pump 22, for transferring fuel from the storage tank 20 to the main tank 18. In operation, the sensor 14 senses the level of fuel in the chamber 12 and activates the switch 16 for automatically turning off the pump 22 to stop the transfer of fuel from the auxiliary tank 20 to the main tank 18.

In the preferred embodiment, the chamber 12 is a hollow box including opposite ends 24 and 26, a front wall 28, a back wall 30, a top 32 and a bottom 34. The chamber 12 is preferably positioned between a receptacle 23, such as a receptacle for receiving a gas pump nozzle through which the main tank 18 receives fuel from an outside source, and the main tank 18.

As shown in FIG. 2, the chamber 12 includes an inlet opening 36 positioned near the bottom 34 at one end 24 and an outlet opening 38 positioned higher than the inlet opening, near the top 32 at the opposite end 26. The apparatus 10 may include a connector, such as a short pipe 40, extending from the inlet opening 36 to connect the chamber 12 to the main tank 18 and a second connector, such as pipe 42, extending from the outlet opening 38 to connect the chamber 12 to the receptacle 23.

In the preferred embodiment, the sensor 14 for monitoring the level of fuel in the chamber 12 is a float device 44. As best seen in FIG. 2, the float device 44 includes a lever 46, a counterbalance 48, a float 50 and a means, such as a switch arm 52, for engaging and activating the switch 16. The lever 46 may be an elongated rod having first end 54 and a second end 56. The float 50 is connected to the second end 56 and the counterbalance 48 is connected at the first end 54. As shown in phantom in FIG. 2, the float may be raised in response to the level of fuel in the chamber 12. When the transfer of fuel from the auxiliary tank 20 to the main tank 18 exceeds the capacity of the main tank, the fuel overflow from the main tank enters the chamber 12 through the inlet opening 36.

The lever 46 is movable between a downward position, when the chamber 12 is empty, and an upward position, when the float has be raised to a predetermined level 55 by the excess fuel entering the chamber 12. The predetermined level 55 is the level of excess fuel in the chamber 12 which will cause the float device 44 to activate the switch 16 to automatically stop the transfer of fuel from the auxiliary tank to the main tank. Because the outlet opening 38 is positioned above the predetermined level 55, the transfer of fuel will be shut off before the excess fuel in the chamber 12 reaches a level which allows the overflow to be discharged from the vehicle through the outlet opening 38.

Referring specifically to FIG. 3, the float device 44 is pivotally secured in the chamber 12 by a support mechanism 60. The support mechanism 60 includes a shaft 70 having opposite ends 72 and 74 and a rotatable sleeve 76. As shown in FIG. 3, the ends 72 and 74 are mounted to the front and back walls 28 and 30 to define a horizontal axle for supporting the float device 44.

In the preferred embodiment, the sleeve 76 is positioned on the shaft 70 and the ends 72 and 74 extend through the walls 28 and 30 to firmly anchor the support mechanism 60 in the chamber 12. As illustrated in FIGS. 2 and 3, the float device 44 is connected to the support mechanism 60 at the first end 54 of the lever 46 adjacent to the counterbalance 48. The rotatable sleeve 76 of the support mechanism 70 permits the lever 46 to pivot freely around the axle in response to the movement of the float 50. Because the sleeve 76 does not extend through the walls 28 and 30, the risk of leaks is minimized while still providing a pivoting support for the float device 44.

Referring to FIGS. 2 and 3, the switch arm 52 includes a lower end 62 and an upper end 64 positioned to activate the switch 16 from the "off" position to the "on" position. A bearing element 66, such as a ball bearing, is rotatably connected to the lower end 62 and engages the lever near the first end 54 of the lever 46. In the preferred embodiment, an attachment, such as a bearing plate 68, is secured to the lever 46 to provide a contact surface on the float device for the bearing 66. The bearing plate 68 may be slightly curved (see FIG. 3) so that the bearing 66 moves easily across its surface resulting in a smooth raising and lowering of the switch arm 52 in response to the movement of the float 50.

In the preferred embodiment, the switch 16 is located outside the chamber 12 and is positioned on the top 32. The switch 16 operates to communicate with the electrical circuit turn to off the pump 22. When the float 50 is raised to the predetermined level 55, the upper end 64 of the switch arm 52 engages and activates the switch, such as by way of example, by completing or opening an electrical circuit in the manner well known to those skilled in the art, to automatically turn the pump 22 off to stop the transfer of fuel. In addition, the switch 16 may be connected to an indicator, such as a pilot light, in the vehicle in a manner well understood in the art, to alert the driver that the switch 1.6 has been activated and permit the driver to manually turn off the pump 22.

While specific embodiments and features of the invention have been disclosed herein, it will be readily understood that the invention encompasses all enhancements and modifications within the scope and spirit of the following claims.

What is claimed is:

1. An apparatus for automatically shutting off the transfer of fuel from an auxiliary tank to a main fuel tank in a motor vehicle having an auxiliary fuel tank, a main fuel tank including a receptacle for receiving fuel from an outside source, a conduit for receiving fuel from the auxiliary tank and an activating means for transferring fuel from the auxiliary tank to the main tank, the apparatus comprising:
   a. a chamber having opposite ends, said chamber being positioned to receive fuel overflow from the main tank;
   b. an inlet opening in one end of the chamber for receiving the fuel overflow into the chamber from the main fuel tank;
   c. a sensor in the chamber for sensing the level of fuel in the chamber; and
   d. a switch operable between on and off positions and connected to and responsive to the sensor wherein the activating means is automatically turned off when the switch is moved to the on position for stopping the transfer of fuel.

2. The apparatus of claim 1, the chamber further comprising an outlet opening in the other end of the chamber, said outlet opening being in a higher position than the inlet opening.

3. The apparatus of claim 2, wherein the outlet opening is in communication with the receptacle.

4. The apparatus of claim 1, wherein the sensor is a float device.

5. The apparatus of claim 4, the float device further comprising:
   a. a lever having a first end and a second end, said lever being movable between a downward position and an upward position;
   b. a support mechanism engaging the first end for pivotally securing the lever inside the chamber;
   c. a counterbalance connected to the lever adjacent to the first end;
   d. a float connected to the second end wherein the fuel overflow into the chamber raises the float; and
   e. a switch arm engaging the lever and responsive to the movement of the lever, wherein the movement of the switch arm activates the switch to the on position when the float is raised to a predetermined level thereby turning off the fuel pump and stopping the transfer of fuel from the auxiliary tank to the main fuel tank.

6. The apparatus of claim 5, the support mechanism further comprising:
   a. a shaft mounted in the chamber defining a horizontal axle for supporting the lever; and
   b. a rotatable sleeve on the shaft, said lever being positioned on the sleeve, said sleeve for permitting the lever to pivot around the axle between the downward and upward positions in response to the movement of the float.

7. The apparatus of claim 5, wherein the switch arm includes an upper end and a lower end and further comprises a bearing element connected to the lower end for rotatably engaging the lever, said upper end being positioned to activate the switch from the off position to the on position when the float is raised to a predetermined level.

8. The apparatus of claim 7, wherein the float device further includes a bearing plate attached to the lever for providing a contact surface for the bearing element, wherein the roller contacts and moves across the bearing plate raising and lowering the switch arm in response to the movement of the lever.

* * * * *